US006396511B1

(12) United States Patent
Karino

(10) Patent No.: US 6,396,511 B1
(45) Date of Patent: May 28, 2002

(54) NETWORK COMMUNICATION SYSTEM NOT REQUIRING MODIFICATIONS OR ADDITIONS TO MANAGER AND AGENT SOFTWARE

(75) Inventor: Toshiyuki Karino, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/203,387

(22) Filed: Dec. 2, 1998

(30) Foreign Application Priority Data

Dec. 4, 1997 (JP) .............................................. 9-334587

(51) Int. Cl.[7] .............................................. G06F 13/00
(52) U.S. Cl. ...................................... 345/744; 709/224
(58) Field of Search ................................ 709/202, 223, 709/224, 246; 710/64, 65; 345/333, 334, 335, 339, 346, 356, 762, 765, 744, 764, 804, 853

(56) References Cited

U.S. PATENT DOCUMENTS

| 5,627,997 | A | * | 5/1997 | Pearson et al. ............... 710/65 |
| 5,961,594 | A | * | 10/1999 | Bouvier et al. ............. 709/223 |
| 6,047,320 | A | * | 4/2000 | Tezuka et al. .............. 709/223 |
| 6,073,162 | A | * | 6/2000 | Johannsen et al. .......... 709/202 |

FOREIGN PATENT DOCUMENTS

| JP | 59-143448 | 8/1984 |
| JP | 3-155253 | 7/1991 |
| JP | H4-273634 | 9/1992 |
| JP | H6-152681 | 5/1994 |
| JP | H7-239816 | 9/1995 |
| JP | 8-181701 | 7/1996 |
| JP | H9-223090 | 8/1997 |
| JP | H10-11347 | 1/1998 |
| JP | H11-164013 | 6/1999 |
| WO | WO 97/22193 | * 6/1997 |

OTHER PUBLICATIONS

IPC 7th Edition, H04L 12/24,26 NTT Technical Journal, Feb. 1995, pp. 29 through 34.
Telecommunications Association Technology Research Report CS 94–68, "Research Into The Application Of Distributed Object Control in T M N Platform," (Aug. 1, 1994), pp. 29 to 34 (CSNT 198801085005).
Telecommuncations Association Technology Research Report CS 93–116, "Methods to Implement OSI Control Object in a Distributed Object Control Platform," (Oct. 7, 1993), p. 25 to 32 (CSNT 199900695004).
Publication of the Information Processing Associated, vol. 34, No. 6, "Unified Control Through OSI in a Distributed LAN Domain," (Jun. 15, 1993), pp. 1426 to 1440 (CSNT 199800304020).
Publications of the Information Processing Association, vol. 37, No. 11, "Implementation and Evaluation of an SNMP/OSI Control Gateway for Monitoring and Controlling a TMN Device Using SNMP," (Nov. 15, 1996), pp. 2083 to 2094 (CSNT 199800267021).

* cited by examiner

Primary Examiner—Cao H. Nguyen
(74) Attorney, Agent, or Firm—Sughrue Mion, PLLC

(57) ABSTRACT

A network communication system is disclosed that does not require modification of or addition to software at a manager or agents. An agent-specific information-common conversion processor carries out conversions between agent-specific information, which is information that can be recognized by exchanges, i.e., the agents, and common information, which is information that can be recognized by the network management system, i.e., the manager that manages the agents. In addition, an interface conversion processor selects the most suitable program and GUI application files for executing set functions and services and notifies the manager.

22 Claims, 4 Drawing Sheets

NETWORK COMMUNICATION SYSTEM NOT REQUIRING MODIFICATIONS OR ADDITIONS TO MANAGER AND AGENT SOFTWARE

BACKGROUND OF THE INVENTION

1. Field of the Invention

The present invention relates to a network communication system consisting of a network management system serving as a manager and a plurality of exchanges connected as agents to this manager, and more particularly to an interface between the manager and agents, and, at the manager, a GUI (graphical user interface) for displaying various types of status information of the agents.

2. Description of the Related Art

In order to satisfy a variety of customer-requested specifications in network communication systems of the prior art, a plurality of system files were prepared in advance and necessary system files were installed to each exchange (hereinafter referred to as "agents") in accordance with the customer specifications. A manager program in accordance with the system files installed in agents connected to the manager was installed in the GUI of the network management system (hereinafter referred to as "manager") for managing each agent. It was therefore necessary to build systems at the manager for each individual agent to be connected.

In recent years, a common GUI has been built at almost all agents by adopting a general interface or standard model that uses standard interfaces and open interfaces. Not all interfaces have been standardized, however, and individualized processing still occurs. Managers must therefore still modify the GUI to connect with each agent.

Various types of such network management systems have been proposed. Japanese Patent Laid-open No. 181701/96, for example, discloses ATM (Asynchronous Transfer Mode) Exchange network management equipment for automatically selecting the most suitable permanent virtual connection path. This invention, however, assumes that the plurality of ATM exchanges connected to the ATM exchange network management equipment are all connected with the ATM exchange network management equipment through the same interface. This invention therefore cannot be applied in cases in which each ATM exchange has individual functions and services, or even its own interfaces.

As another example, Japanese Patent Laid-open No. 143448/84 discloses an invention in which the back-up files of a plurality of exchanges that are centrally managed at a network management center are supplied from the network management center to each exchange. In this invention, the network management center must have the back-up files of each of the exchanges connected to the network management center in a case in which dissimilar functions are to be established at each of the exchanges.

The aforementioned network communication systems of the prior art thus have the following drawbacks:

(1) In cases in which the interfaces of a plurality of agents are not unified, the manager must be provided with the corresponding manager program for each different interface.

(2) Because GUI application files provided at the manager relate to the functions and services of agents, GUI application files for every function or service of agents are required if differing functions must be established for each of the agents.

(3) Addition to or modification of a function or service that has already been established at agents require the modification of or addition to the manager program of the manager.

SUMMARY OF THE INVENTION

It is an object of the present invention to provide a network communication system that does not require addition to or modification of manager and agent software even in cases when differing functions must be established at each of the agents.

To achieve the above-described object, the present invention proposes a network communication system that includes a plurality of exchanges and a network management system. The plurality of exchanges include an agent-specific information common-conversion processor that is controlled as agents, for converting agent-specific information that can be recognized by agents to common information that can be recognized by the manager that performs control of agents, sending this information to the manager, and converting common information supplied from the manager to agent-specific information.

The network management system acts as a manager that manages each exchange as an agent.

By means of the agent-specific information-common conversion processor, agent-specific information is converted to common information that can be recognized in the network management system and then fed to the network management system, and common information outputted from the network management system is converted to agent-specific information and then managed.

There is consequently no need to provide manager programs according to interfaces at the manager even if the interfaces of exchanges, which are agents, differ each other. As a result, the manager need be provided with only a standard manager program even when controlling agents having differing interfaces.

According to an embodiment of the present invention, the exchanges further have an interface conversion processor that selects the most suitable GUI application file and most suitable program for effecting established functions and services, and that sends notification of the selected program and GUI application file to the network management system.

By means of the interface conversion processor, the most suitable GUI application file and most suitable program for effecting the established functions and services are selected, and the selected programs and GUI application files are notified to the network management system.

The network management system, which is the manager, therefore does not need to be provided with a corresponding GUI application file and program for each agent. Furthermore, even in a case in which a new function is added to a particular agent, the new application software need be developed and sent only to that agent, and no modification is necessary for the network management system, i.e., the manager, or for other agents.

The above and other objects, features, and advantages of the present invention will become apparent from the following description with reference to the accompanying drawings which illustrate examples of the present invention.

Figure 1:
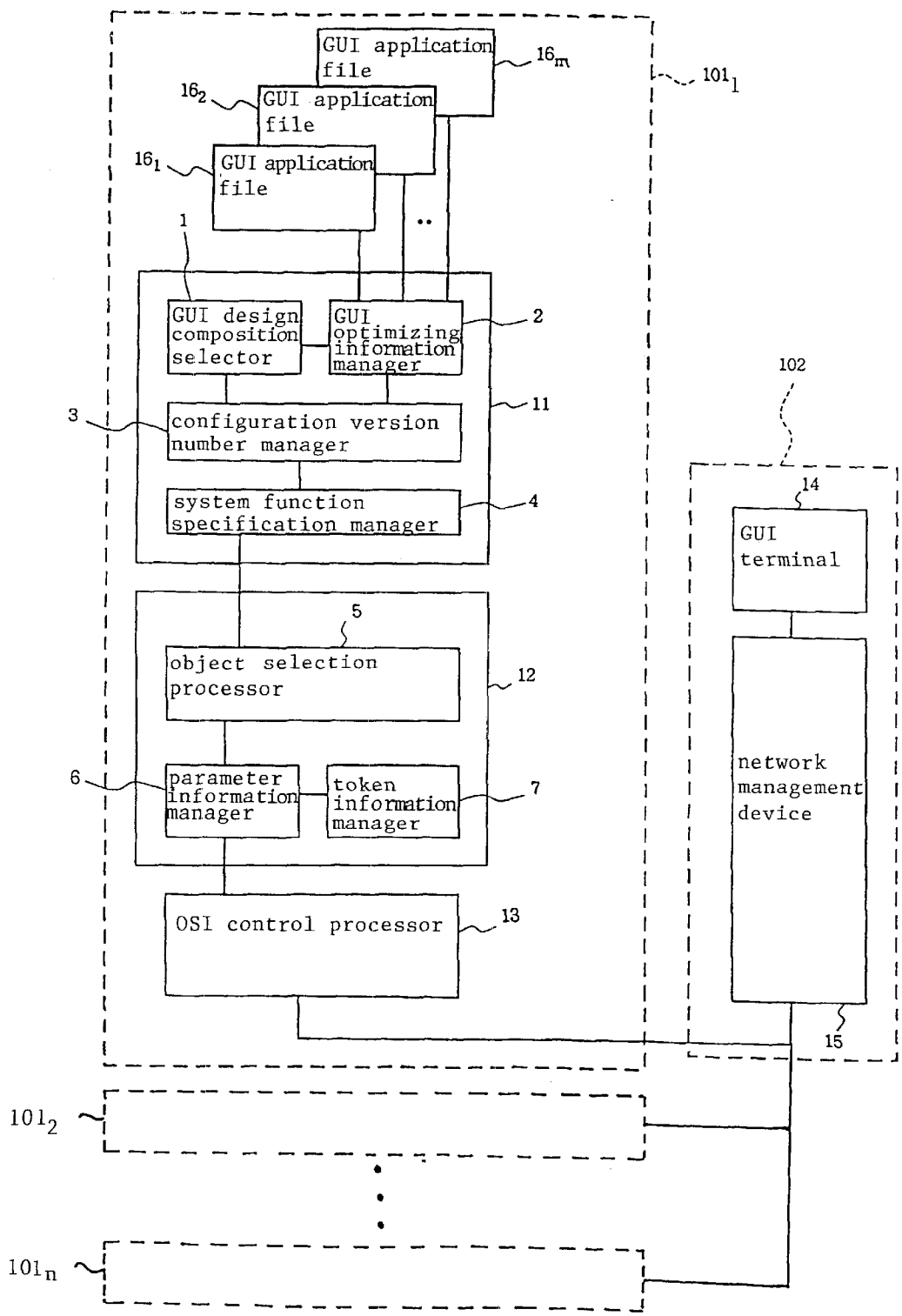
FIG. 1 is a block diagram showing the construction of a network communication system according to the first embodiment of the present invention.

DETAILED DESCRIPTION OF THE PREFERRED EMBODIMENTS:

Referring now to FIG. 1, there is illustrated a network communication system wherein a network management system 102, which is the manager, and a plurality of exchanges $101_1$–$101_n$, which are the agents, are connected each other through open system interconnection (OSI) protocol.

An exchange $101_1$, which is an agent, comprises an interface conversion processor 11, an agent-specific information-common conversion processor 12, and an OSI control processor 13. Exchange $101_1$ has in addition GUI application files $16_1$–$16_m$ for the realization of a variety of functions and services.

A network management system 102, which is the manager, comprises a GUI terminal 14 and a network management device 15.

GUI terminal 14 displays the status information of exchanges 101 on a screen by using GUI application files notified from exchanges $101_1$–$101_n$.

Network management device 15 manages each of the plurality of connected exchanges $101_1$–$101_n$.

OSI control processor 13 connects interface conversion processor 11 and agent-specific information-common conversion processor 12 to the network management device 15 of network management system 102 by the use of OSI protocol.

Interface conversion processor 11 selects the most suitable program and most suitable GUI application file for executing the functions and services established at exchanges $110_1$–$101_n$ and notifies the network management system 102, which is the manager.

Agent-specific information-common conversion processor 12 converts agent-specific information that exchanges $101_1$–$101_n$ can recognize, to common information that network management system 102 can recognize, and then transmits to network management system 102, and converts common information transmitted from network management system 102 to agent-specific information. This common information contains object information, parameter information, and token information.

Interface conversion processor 11 includes GUI design composition selector 1, GUI optimizing information manager 2, configuration version number manager 3, and system function specification manager 4.

GUI design composition selector 1 selects the GUI function having the most suitable operating procedures from agent-specific information. GUI design composition selector 1 also selects the most suitable screen display and screen representation.

GUI optimizing information manager 2 stores optimized information, which is the agent-specific information selected by GUI design composition selector 1, and, when necessary, transmits information to and receives information from the GUI of network management system 102.

Configuration version number manager 3 functions to manage the version number and composition relating to software.

System function specification manager 4 analyzes the specification conditions of the system functions according to the specifications requested by a client and determines the system composition that satisfies the required conditions.

Agent-specific information-common conversion processor 12 further includes object selection processor 5, parameter information manager 6, and token information manager 7.

Object selection processor 5 includes an object conversion table (not shown) and, when data to be processed are input data sent from network management system 102, extracts object information from the input data and converts the extracted object information to agent-specific information; and, when the data to be processed are output data to be outputted to network management system 102, converts the output data to object information and sets the converted object information to the output format.

Parameter information manager 6 includes a parameter conversion table, and, when the data to be processed are input data sent from the manager, extracts parameter data from the input data and converts the extracted parameter information to agent-specific information; and, when the data to be processed are output data to be outputted to network management system 102, converts the output data to parameter information and sets the converted parameter information to the output format.

Token information manager 7 includes a token data conversion table, and, when the data to be processed are input data sent from the manager, extracts token information from the input data and converts the extracted token information to agent-specific information; and, when the data to be processed are output data to be outputted to network management system 102, converts the output data to token information and sets the converted token information to output format.

Figure 2:
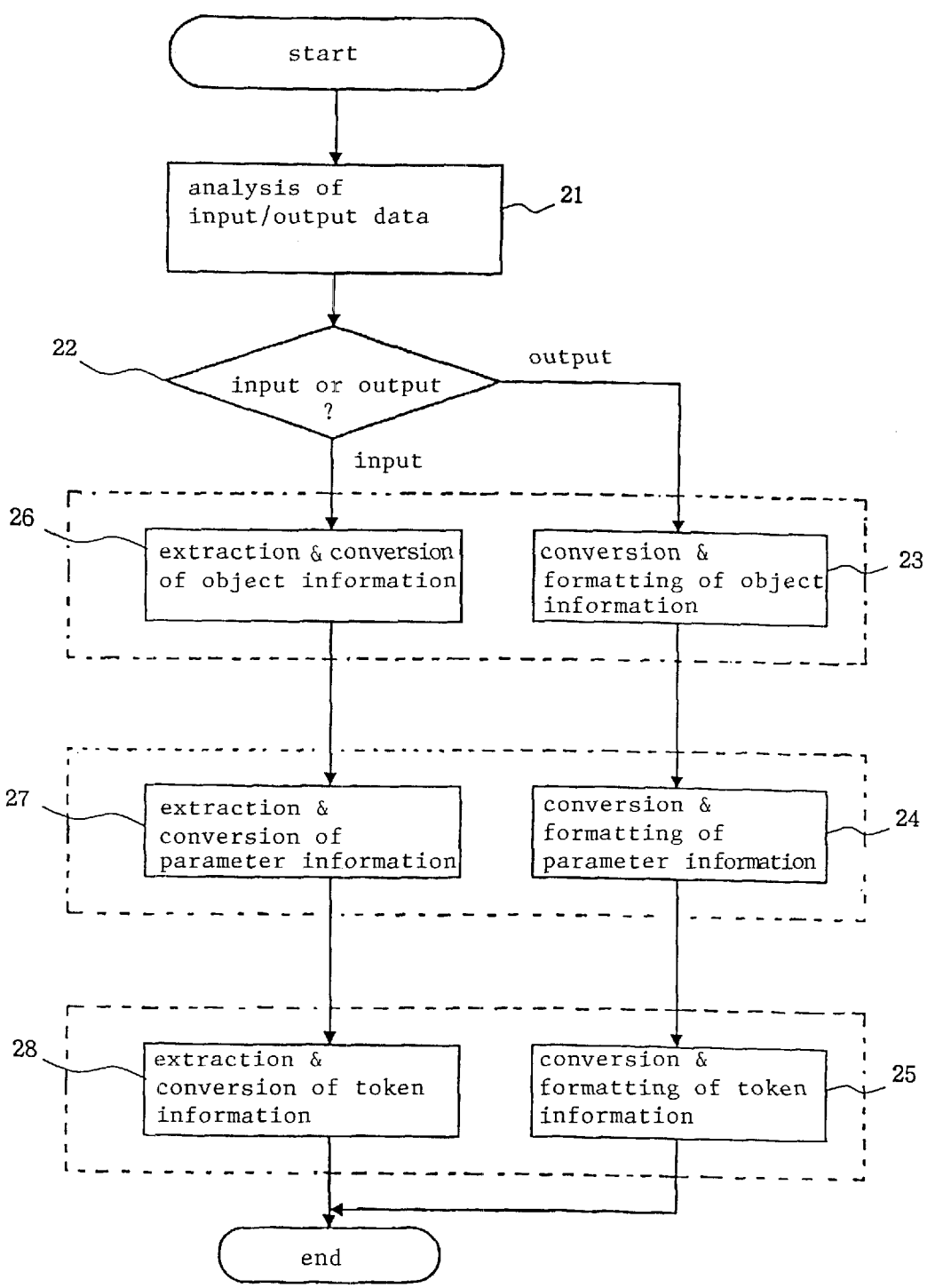
FIG. 2 is a flow chart showing the operations of agent-specific information-common conversion processor 12 in FIG. 1.

The operation of this embodiment will be explained below in detail with reference to FIG. 2, which shows the operation of agent-specific information-common conversion processor 12.

In agent-specific information-common conversion processor 12, passing input/output data are first analyzed at Step 21, and it is determined at step 22 wherein the data is input data sent from network management system 102, which is the manager, or output data transmitted from an agent to network management system 102.

In object selection processor 5 it is determined at step 22 whether input/output data are input data sent from network management system 102 or output data outputted to the manager. If the input/output data are input data sent from network management system 102, then object information is extracted from the input data and the extracted object information is converted to agent-specific information at Step 26. Conversely, if the input/output data are output data to be outputted to network management system 102, then the output data are converted to object information and the converted object information is set to output format at Step 23.

At parameter information manager 6, if the data are input data from the manager, then parameter information is extracted from the input data and the extracted parameter information is converted to agent-specific information at Step 27 and if the data are output data for network management system 102, the output data are converted to parameter information and the converted parameter information is set at Step 24.

Finally, at token information manager 7, if the data are input data from network management system 102, then token information is extracted from the input data and the extracted token information is converted to agent-specific information at Step 28, and if the data are output data for network management system 102, then the output data are converted to token information and the converted token information is set at Step 25.

An example of the object conversion table used in object selection processor 5 is shown below in Table 1.

TABLE 1

| ITU-T | ETSI | ANSI | Other 1 |
|---|---|---|---|
| Object Management Function | ← Object Management Function | | |
| State Management Function | ← State Management Function | | |
| Scheduling Function | ← Scheduling Function | | |
| Alarm reporting Function | ← Alarm reporting Function | alarmRecording | |
| Event Reporting Function | ← Event Reporting Function | eventReporting | |
| Security Alarm Function | ← Security Alarm Function | securityControle | |
| ... | ... | | |
| ... | ... | | |
| Customer administration | ... | | |
| Performance Management | ... | | |
| ... | ... | atmAccessProfile | |

This object conversion table shows objects corresponding to a number of existing recommendations and stipulated specifications, and indicates whether or not an agent is capable of accommodate an object.

In Table 1, ITU-T indicates International Telecommunication Union-Telecommunication, ETSI indicates the European Telecommunications Standards Institute, and ANSI indicates the American National Standards Institute, Inc.

An example of a parameter management table used in parameter information manager 6 is next shown in Table 2, and an example of a token data conversion table used in token information manager 7 is shown in Table 3.

This example of a parameter management table shows the correspondence between the operation and commands of parameter information manager 6 and a variety of recommendations and a number of specifications.

TABLE 2

| ITU-T | ESTI | Other 1 | Other 2 |
|---|---|---|---|
| SET | set | | SET |
| GET | get | View | GET |
| ACTION | action | Action | ACTION |
| CREATE | create | | |
| DELETE | delete | | |
| EVENT-REPORT | event-report | Event-Report | EVENT-REPORT |
| CANCEL-GET | cancel-get | | |
| | | In-Service block | |

TABLE 3

| ITU-T | ETSI | Other 1 |
|---|---|---|
| OID-123456 | OID-123456 | OID-8123456 |
| OID-234567 | OID-234567 | OID-8234567 |
| OID-345678 | OID-345678 | OID-8345678 |
| ... | OID-abcdefg | OID-8abcdefg |
| ... | ... | OID-9abababab |

This example of a token data conversion table shows the correspondence between the object identifiers (Object IDentifiers, which are a type of token data, and a variety of recommendations and values.

Figure 3:
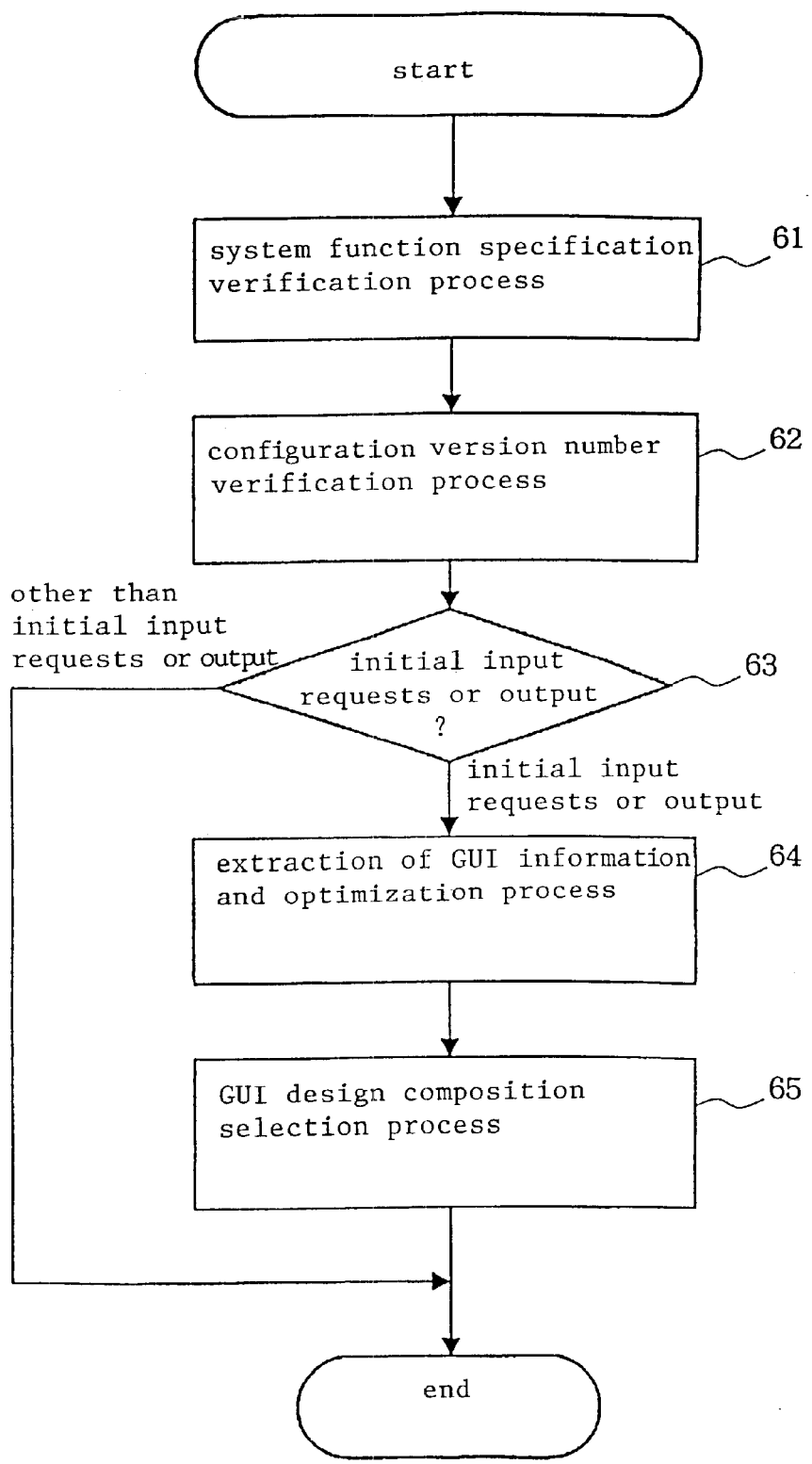
FIG. 3 is a flow chart showing the operation of interface conversion processor 11 in the first embodiment of FIG. 1.

The operation of interface conversion processor 11 will be explained below with the reference to FIG. 3.

First, at interface conversion processor 11, a system function specification verification process is carried out at Step 61 in which the specification conditions of the system functions are analyzed by system function specification manager 4, and a system composition that satisfies these specification conditions is determined.

Subsequently, at configuration version number manager 3, a configuration version number verification process is carried out at Step 62 to verify the version number of software corresponding to application functions and GUI processes.

The verification of the version number of the software by configuration version number manager 3 as in this embodiment is effective in cases in which the version numbers of software of network management system 102 differs due to the year of the recommendations, or in cases in which the specification that can be handled differs due to the year of development of the software of exchanges 101.

Subsequently, it is determined at Step 63 whether or not the data to be processed are initial input requests or output, and if the data are not initial input requests or output, process is completed.

If it is determined at Step 63 that the data to be processed are initial input requests or output, extraction of GUI information and optimization processing are carried out at Step 64 by GUI optimizing information manager 2.

Finally, a GUI design composition selection process is carried out by GUI design composition selector 1 at Step 65.

Table 4 shows one example of a system function specification list, Table 5 shows one example of a function specification conditions list in which the conditions in a system function specification list are listed, and Table 6 shows one example of a configuration version number management list.

TABLE 4

| Function | No Conditions | Condition 1 | Condition 2 | Condition n |
|---|---|---|---|---|
| Service 1 | ○ | | | |
| Service 2 | | | ○ | |
| Service 3 | | | | ○ |
| Service n | | ○ | | |

TABLE 5

| Condition | Content | Other |
|---|---|---|
| No Conditions | Not dependent on specification | |
| Condition 1 | Manager based on same vender specifications as agent | |
| Condition 2 | Country of purchase is "Country x" and therefore based on that country's specifications | "Country x" |
| Condition n | The processor is "x" and therefore based on that processor's specifications | |

TABLE 6

| File Type | Service 1 | Service 2 | Service 3 | Service n |
|---|---|---|---|---|
| GUI-APL File $16_1$ | Version 1.1 | Version 1.1 | Version 1.1 | Version 2.1 |
| GUI-APL File $16_2$ | Version 1.1 | Version 2.0 | Version 1.1 | Version 1.1 |
| GUI-APL File $16_3$ | Version 2.1 | Version 1.1 | Version 1.1 | Version 1.3 |

Figure 4:
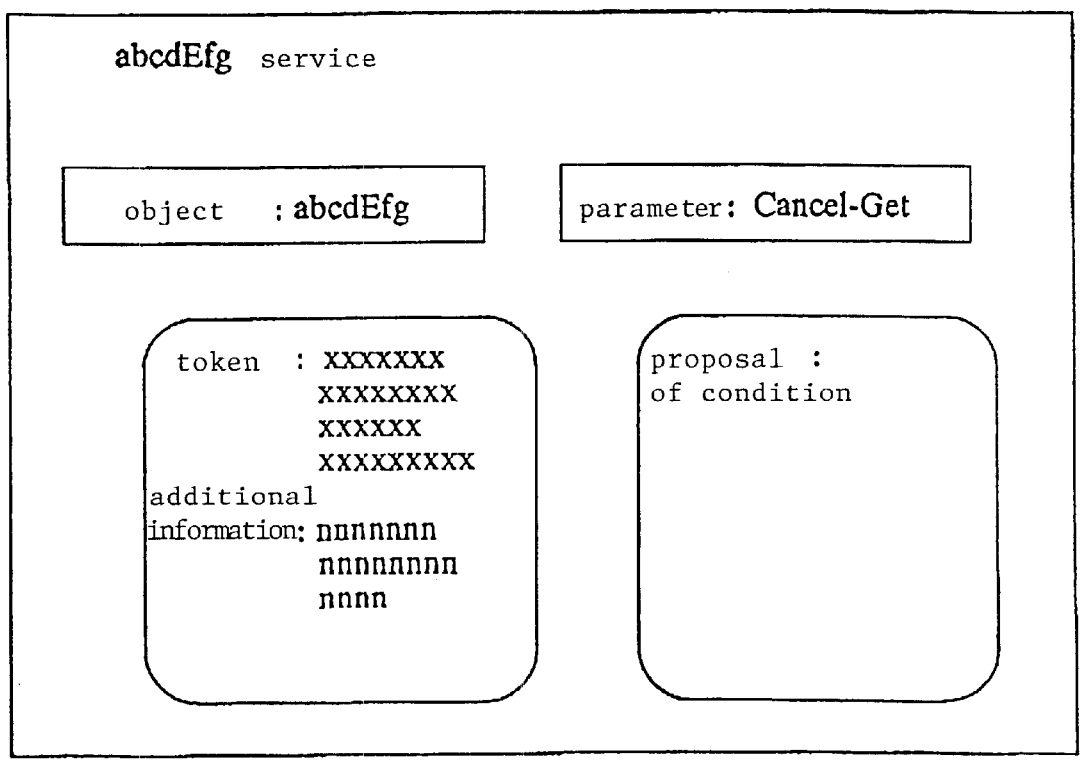
FIG. 4 is a chart showing an example of screen information of GUI terminal 14 in the first embodiment of FIG. 1.

FIG. 4 shows one example of the information displayed on the screen of GUI terminal 14 according to GUI application file notified from exchanges $101_1$–$101_n$. This screen information is an example of the operation or description method of the objects, parameters, or tokens.

While a preferred embodiment of the present invention has been described using specific terms, such description is for illustrative purposes only, and it is to be understood that changes and variations may be made without departing from the spirit or scope of the following claims.

What is claimed is:

1. A network communication system comprising:
    a plurality of exchanges, being controlled as agents and having agent-specific information-common conversion processing means, for converting agent-specific information that can be recognized by an agent to common information that can be recognized by a manager that manages the agents, capable of directly sending the information from each of said plurality of exchanges to said manager, and for converting common information that is sent from said manager to said agent-specific information; and
    a network management system, which is a manager for managing each of said exchanges as agents, wherein said exchanges comprise an interface conversion processing means for selecting a most suitable program and most suitable GUI application file for the realization of set functions and services and for notifying said network management system of the selected program and GUI application file.

2. A network communication system according to claim 1 wherein said exchanges further comprise an interface conversion processing means for selecting a most suitable program and most suitable GUI application file for the realization of set functions and services and for notifying said network management system of the selected program and GUI application file.

3. A network communication system according to claim 2 wherein said interface conversion processing means comprises:
    GUI design composition selecting means for selecting from said agent-specific information GUI functions for having the most suitable operating procedure;
    GUI optimized information managing means for storing optimized information, which is agent-specific information selected by said GUI design composition selecting means, and for transmitting information to and receiving information from the GUI of the manager when necessary;
    configuration version number managing-means for managing version number and composition relating to software; and
    system function specification managing means for analyzing the specified conditions of the system functions of the customer-requested specifications to determine the system composition that satisfies these specification conditions.

4. A network communication system according to claim 1 wherein said agent-specific information-common conversion processing means comprises:
    object selection processing means, when the data to be processed are input data sent from the manager, for extracting object information from said input data and converting the extracted object information to agent-specific information; and, when the data to be processed are output data to be outputted to said manager, for converting the output data to object information and setting the converted object information to output format;
    parameter information managing means, when the data to be processed are input data sent from the manager, for extracting parameter information from input data and converting the extracted parameter information to agent-specific information, and, when the data to be processed are output data to be outputted to the manager, for converting the output data to parameter information and setting the converted parameter information to output format;
    token information managing means, when the data to be processed are input data sent in from the manager, for extracting token information from input data and converting the extracted token information to agent-specific information, and, when the data to be processed are output data to be outputted to the manager, for converting output data to token information and setting the converted token information to output format.

5. A network communication system according to claim 1 wherein said network management system comprises a GUI terminal for displaying on a screen the state information of said exchanges through the use of a GUI application file notified from said exchanges, and a network managing device for managing each of said plurality of exchanges that are connected to said network management system.

6. A network communication system, comprising:
    a plurality of exchanges, being controlled as agents and having agent-specific information-common conversion processing means, for converting agent-specific information that can be recognized by an agent to common information that can be recognized by a manager that manages the agents, for sending the information to said manager, and for converting common information to said agent-specific information; and
    a network management system configured for managing each of said exchanges as agents, wherein said exchanges comprise an interface conversion processing means for selecting a most suitable program and most suitable GUT application file for the realization of set functions and services and for notifying said network management system of the selected program and GUI application file.

7. The network communication system of claim 6, said interface conversion processing means comprising:
- GUI design composition selecting means for selecting from said agent-specific information GUI functions for having the most suitable operating procedure;
- GUI optimized information managing means for storing optimized information, which is agent-specific information selected by said GUI design composition selecting means, and for transmitting information to and receiving information from the GUI of the manager when necessary;
- configuration version number managing means for managing version number and composition relating to software; and
- system function specification managing means for analyzing the specified conditions of the system functions of the customer-requested specifications to determine the system composition that satisfies these specification conditions.

8. A network communication system, comprising:
- a plurality of exchanges, being controlled as agents and having agent-specific information-common conversion processing means, for converting agent-specific information that can be recognized by an agent to common information that can be recognized by a manager that manages the agents, for sending the information to said manager, and for converting common information to said agent-specific information; and
- a network management system configured for managing each of said exchanges as agents, wherein said agent-specific information-common conversion means comprises,
  - object selection processing means, when the data to be processed are input data sent from the manager, for extracting object information from said input data and converting the extracted object information from said input data and converting the extracted object information to agent-specific information, and when the data to be processed are output data to be outputted to said manager, for converting the output data to be outputted to said manager, for converting the output data to object information and setting the converted object information to output format,
  - parameter information managing means, when the data to be processed are input data sent from the manager, for extracting parameter information from input data and converting the extracted parameter information to agent-specific information, and, when the data to be processed are output data to be outputted to the manager, for converting the output data to parameter information and setting the converted parameter information to output format; and
  - token information managing means, when the data to be processed are input data sent in from the manager, for extracting token information from input data and converting the extracted token information to agent-specific information, and, when the data to be processed are output data to be outputted to the manager, for converting output data to token information and setting the converted token information to output format.

9. A network communication system, comprising:
- a plurality of exchanges, being controlled as agents and having agent-specific information-common conversion processing means, for converting agent-specific information that can be recognized by an agent to common information that can be recognized by a manager that manages the agents, for sending the information to said manager, and for converting common information to said agent-specific information; and
- a network management system configured for managing each of said exchanges as agents, wherein said network management system comprises a GUI terminal for displaying on a screen the state information of said exchanges through the use of a GAL application file notified from said exchanges, and a network managing device for managing each of said plurality of exchanges that are connected to said network management system.

10. A network communication system, comprising:
- a plurality of exchanges configured to convert between agent-specific information capable of being recognized by an agent and common information capable of being recognized by a manager; and
- a network management system coupled to directly manage each of said plurality of exchanges, wherein said network management system comprises a GUI terminal for displaying on a screen the state information of said exchanges through the use of a GUI application file notified from said exchanges, and a network managing device for managing each of said plurality of exchanges that are connected to said network management system.

11. The network communication system of claim 10, the network management system comprising:
- a display device configured to display an output in accordance with information received from said plurality of exchanges; and
- a network management device configured to manage said plurality of exchanges.

12. The network communication system of claim 11, wherein said display device is a GUI terminal.

13. The network communication system of claim 10, each of said plurality of exchanges comprising:
- an interface conversion processor configured to select a suitable file from at least one file in accordance with predetermined agent-specific criteria;
- an agent-specific information-common information conversion processor coupled to said interface conversion processor for converting between said agent-specific information and common information; and
- a control processor coupled to said agent-specific information-common information conversion processor and configured to manage communication between said network management system and at least one of said agent-specific information-common information conversion processor and said interface conversion processor.

14. The network communication system of claim 13, wherein said at least one file is a GUI application file.

15. The network communication system of claim 13, the interface conversion processor comprising:
- a selector that selects said suitable file based on said predetermined agent-specific criteria and provides a determination of suitability;
- an optimizer that stores optimized information received from said selector, and transfers said optimized information to said network management system; and
- a version manager that manages software configuration information and prescribed system conditions to determine whether predetermined conditions have been met.

16. The network communication system of claim 13, the agent-specific information common information conversion processor comprising:

an object selection processor configured to extract object information and convert said object information between agent-specific information and common information, a parameter information manager configured to extract parameter information and convert said parameter information between agent-specific information and common information; and a token information manager configured to extract and convert token information between agent-specific information and common information.

17. A method for managing network communications, comprising:

independently receiving data having a first format in each of a plurality of exchanges;

processing said data in accordance with said first format; and converting said data to a second format in an agent-specific information-common information conversion processor, wherein said exchanges use an interface conversion processing means to select a most suitable program and a most suitable GUI application file for the realization of set functions and services and for notifying said network management system of the selected program and GUI application file.

18. The method of claim 17, said converting step comprising:

extracting a first, second and third information having said first format from said data having said first format; and converting said first, second and third extracted information having said first format to respective said first, second and third information having said second format.

19. The method of claim 18, wherein said first information is an object information, said second information is a parameter information and said third information is a token information.

20. The method of claim 17, said converting step comprising:

converting a first, second and third information having said first format to respective said first, second and third information having said second format;

formatting said first, second and third information having said second format; and outputting said first, second and third information to said network management system via a control processor.

21. The method of claim 17, said processing step comprising:

analyzing a prescribed set of exchange conditions and determining a satisfying system composition;

verifying a version number of predetermined software corresponding to predetermined application functions and processes; and determining whether an initial process has been requested.

22. The method of claim 21, wherein said initial process has been requested, further comprising:

extracting and optimizing a data display information in accordance with said satisfying system composition; and selecting a data display design in accordance with said extracted and optimized data display information.

* * * * *